United States Patent [19]

Itani

[11] Patent Number: 4,467,379
[45] Date of Patent: Aug. 21, 1984

[54] RECORDING AND/OR REPRODUCING DEVICE MAKING USE OF A CASSETTE

[75] Inventor: Takashi Itani, Kanagawa, Japan

[73] Assignee: Canon Kabushiki Kaisha, Tokyo, Japan

[21] Appl. No.: 326,288

[22] Filed: Dec. 1, 1981

[30] Foreign Application Priority Data

Dec. 9, 1980 [JP] Japan .................................. 55-174123

[51] Int. Cl.³ ...................... G11B 5/008; G11B 15/00; G11B 17/00
[52] U.S. Cl. ................................... 360/96.5; 360/137; 360/93
[58] Field of Search ..................... 360/96.5, 96.6, 96.1, 360/91, 137, 105, 97, 93, 95; 242/195, 198

[56] References Cited

U.S. PATENT DOCUMENTS

| | | | |
|---|---|---|---|
| 4,126,888 | 11/1978 | Hayashi | 360/95 |
| 4,130,848 | 12/1978 | Amano | 360/93 |
| 4,145,727 | 3/1979 | Tuninetti | 360/137 |
| 4,331,988 | 5/1982 | Kawai | 360/96.6 |
| 4,345,283 | 8/1982 | Maryschka | 360/137 |

*Primary Examiner*—Robert Martin Kilgore
*Attorney, Agent, or Firm*—Toren, McGeady and Stanger

[57] ABSTRACT

A recording and/or reproducing device arranged to use a cassette containing a recording medium such as a tape, includes a tape loading mechanism operative to displace the tape contained in the cassette to a position at which the tape is in operative relation to a recording head. A cassette displacing arrangement into which the cassette is first loaded is movable to a position where the cassette is in operative relation to the tape loading mechanism. A member on the displacing arrangement serves to hold the cassette at a certain position relative to the displacing arrangement so that the cassette will be moved into operative relation with the tape loading mechanism by the displacing arrangement.

7 Claims, 4 Drawing Figures

RECORDING AND/OR REPRODUCING DEVICE MAKING USE OF A CASSETTE

BACKGROUND OF THE INVENTION

1. Field of the Invention

The present invention relates to a recording and/or reproducing device, which uses a cassette, a magazine or a cartridge which contains recording means, and particularly to a device of the type in which, at the time of recording or reproducing, the recording means is loaded with respect to a head.

2. Description of the Prior Art

In the conventional home VTR or VCR, in which cassette type magnetic tape is used, there are two systems for loading the cassette tape with respect to the tape head. In accordance with the parallel loading system, in order to load the cassette in the VTR body the cassette is first loaded in a displaceable cassette loading chamber, and is then pushed down from the upper surface of the machine so as to be at a determined loading position. When the cassette loading chamber is set at the determined position at which tape loading is possible, a shaft for implementing tape loading is brought into openings in the cassette, and then the shaft pulls the tape out from the cassette so as to wind the tape on the rotary head drum surface. In the VTR of the parallel loading type, when the cassette is not loaded at the correct position, the loading shaft is often brought in contact with the tape or inserted on the opposite side of the tape. When the tape runs in the above state, the tape is damaged or misloading takes place. Especially in a portable VTR, in which a compact cassette is used, the opening for the loading shaft is so small that the above-mentioned misloading often takes places.

SUMMARY OF THE INVENTION

An object of the present invention is to eliminate the above-mentioned shortcomings of the conventional techniques.

Another object of the present invention is to offer a recording and/or reproducing device by means of which misloading can be avoided, while a stabilized and sure loading is possible.

A further object of the present invention is to offer a recording and/or reproducing device in which, due to stabilized and correct cassette loading, the hole in which the loading means is inserted can be made small so that the recording means capacity of the cassette can be increased.

Yet another object of the present invention is to offer a cassette loading chamber in which the cassette can be loaded easily, while stabilized and sure cassette loading is guaranteed.

In accordance with an embodiment of the present invention, when the cassette is loaded into the cassette loading chamber, the cassette is positioned so as to facilitate correct tape loading. Then, the loading chamber is displaced so as to enable the tape loading so that the loading operation is remarkably simplified.

Further, in accordance to another embodiment, when the cassette is loaded in the loading chamber, the cassette is elastically pressed and held at a determined position so that the loading chamber can be made a little larger than the cassette, which makes the cassette loading smooth. Because the cassette is accurately set at the determined position in the loading chamber, the recording means in the cassette is surely engaged with the loading means. Consequently, it can be avoided that the recording means should be damaged.

In yet another embodiment, the cassette can be held correctly in the cassette loading chamber, and the hole into which the loading means is inserted can be made small so that the amount of recording means contained in the cassette can be increased.

DETAILED DESCRIPTION OF THE PREFERRED EMBODIMENT

Figure 1:
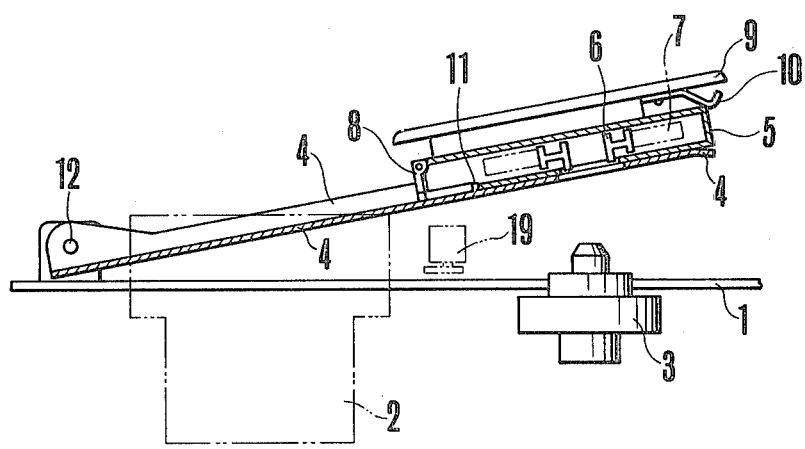
FIG. 1 shows the construction of an embodiment of the cassette holding device in accordance with the present invention.
Figure 3:
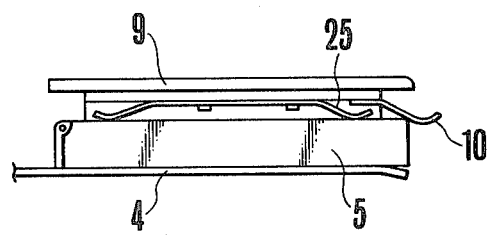
FIG. 3 shows the side view of the cassette holding part of the device shown in FIG. 1.

FIG. 1 shows in section an embodiment of the cassette holding device in accordance with the present invention for the cassette type VTR. The drawing shows a cassette holding base plate 1 in the VTR body, a rotary head drum 2, a driving stand 3 for the tape reel, a cassette holding spring plate 4 constituting the cassette displacement means for displacing the cassette, and a cassette case 5 in which there are provided two reels 6 with flanges on both sides, on which reels the tape 7 is wound. The cassette 5 is provided with a cover 8 at the tape loading side, which cover is arranged to be opened by means of a projection (not shown in the drawing) on the base plate when the holding spring 4 is lowered down to the loading position. An upper cover 9 of the cassette loading part determines the upward, i.e., vertical and downward position of the cassette which is loaded. On the surface of the upper cover 9 is a spring 25 as shown in FIG. 3, to be brought in contact with the cassette so as to urge the cassette 5 toward the holding spring plate 4. A hinge shaft 12 is provided for the cassette holding spring plate 4. A spring 10 in accordance with the present invention is provided on the upper cover 9, which spring can be depressed so as to allow the loading of the cassette. When the cassette 5 is inserted until it is brought in contact with a stopper 11 formed by a bent part of the cassette holding spring plate 4, or a projection, the spring 10 urges the cassette 5 toward the drum so as to hold the cassette 5 is contact with the stopper 11. In this way, the cassette 5 is loaded surely at a determined position relative to the cassette holding spring plate 4, by holding means comprising the stopper 11.

Figure 2:
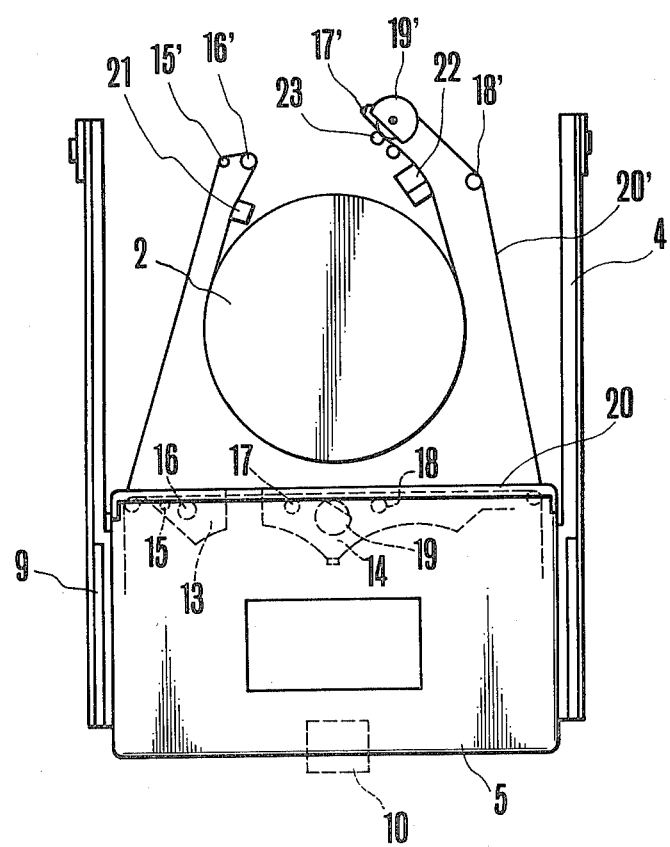
FIG. 2 shows the cassette loaded in the VTR provided with the cassette holding device in accordance with the present invention in plan view.

When the cassette holding spring plate 4 is lowered out of the state shown in FIG. 1 down to the loading position, tape loading shafts 15, 16, 17 and 18 and a pinch roll 19 are brought into openings 13 and 14 of the cassette case 5 shown in FIG. 2. Because at this time, the cassette 5 is urged by means of the spring 10 toward the drum 2 so as to be held at the determined position, the tape loading shafts or the pinch roller are never brought in contact with the tape 20 on the, loading plane of the cassette or brought outside of the tape so that misloading never takes place.

FIG. 2 shows the loaded cassette state of the VTR having the cassette holding device in accordance with the present invention, in plan view. Into the opening 13, shown in a dotted line in the drawing, are brought the tape loading shafts 15 and 16, and into the opening 14 are brought the loading shafts 17 and 18 and the pinch roller 19. When the cassette 5 is lowered down to the loading position together with the cassette holding spring plate 4, the tape 20 in the cassette lies along the cassette wall at the drum side of the cassette, as is shown in a dotted line. When as shown in FIG. 2, the loading shafts 15 and 16 are brought into the positions 15' and 16', and the loading shafts 17, 18, and the pinch roller 19 into the positions 17', 18' and 19' along with the tape loading operation, the tape 20 is brought into contact with the rotary head drum 2, the total width erasing head 21, the sound head, the control head 22 and the capstan 23, so as to terminate the tape loading. FIG. 3 shows, in side view, the embodiment of the cassette holding part in accordance with the present invention shown in FIG. 1. In the drawing, the plate spring 25 is provided inside of the upper cover 9 so as to urge the cassette toward the cassette holding spring plate 4.

Figure 4:
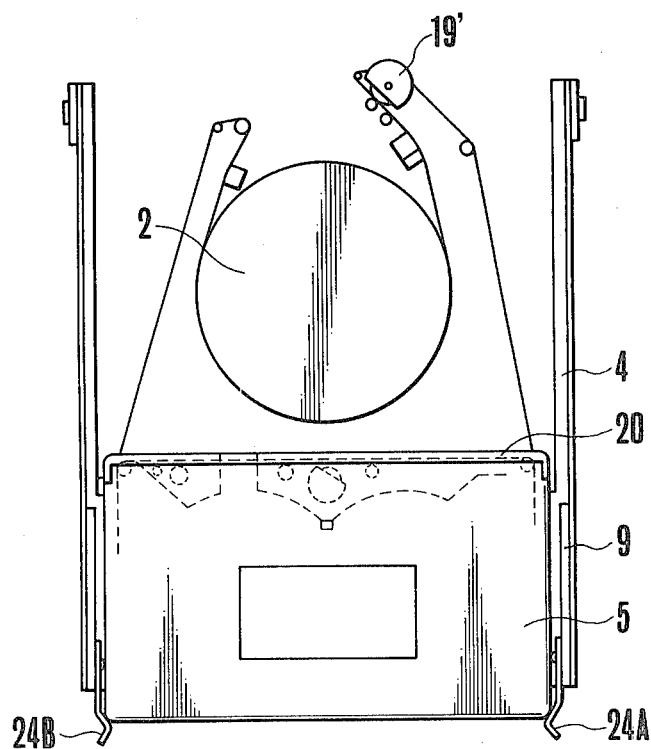
FIG. 4 shows another embodiment of the present invention in plan view.

FIG. 4 shows another embodiment of the present invention in plan view. The spring for urging the cassette toward the loading side, namely the drum, is provided on the side of the upper cover 9 of the cassette loading chamber. Also in this embodiment, there is provided the spring 25 shown in FIG. 3, for urging the cassette 5 toward the cassette holding spring plate 4, so that the cassette 5 is pressed toward the holding spring plate 4. Further, because the cassette is urged toward the loading direction by means of springs 24A and 24B so as to be held at the determined position, the cassette can be loaded surely in the same way as in the first embodiment. Although in the embodiment in FIG. 4, the springs 24A and 24B are provided to contact both sides of the cassette, it will be apparent that only one spring will suffice. That is, any position of the spring in accordance with the present invention will suffice as long as the cassette 5 is urged so as to be held at the determined position in the cassette loading chamber.

As explained so far in accordance with the present invention, when the cassette is loaded in the cassette holding part, the loading shafts and the pinch roller are correctly brought into the openings in the cassette after the cassette is urged and held at the determined position in the cassette loading chamber, so that misloading due to the incorrect positioning of the cassette within the cassette loading chamber is avoided. Particularly, even with a compact cassette, precise loading is possible. Further, the openings in the cassette into which the loading shafts are brought can be made small, so that the amount of recording means or medium such as magnetic tape contained in the cassette can be increased. Also, even if the cassette loading chamber is made large as compared with the cassette, the correct engagement with the loading means can be obtained, so that the cassette can be loaded in the cassette loading chamber smoothly, whereby a one touch exchange of cassette is possible.

Although in the first and the second embodiment recording means of magnetic tape is mentioned, the recording means is not limited to magnetic tape. Any recording means such as of disc shape, card shape or sheet form, which can be moved from a cassette to a position at which recording or the reproducing by means of a head, is possible may be used.

Moreover it is not necessary that the recording or the reproducing system be magnetic. Further, it is not necessary that the cassette should be of box shape as in the illustrated embodiment, since any shape capable of defining a certain determined frame will suffice.

What is claimed is:

1. A recording and/or reproducing apparatus arranged to use a record bearing medium supported by a pair of supporting members within a cassette, said apparatus comprising:
   (A) recording and/or reproducing means for recording signals on and/or reproducing signals from the record bearing medium;
   (B) receiving means for receiving therein the cassette, said receving means being movable between a first position where the receiving means receives the cassette from a predetermined direction and a second position where the receiving means places the received cassette at a predetermined position for the signal recording and/or reproduction and having:
      (B-1) a chamber for accommodating the cassette, said chamber having an opening for enabling the cassette to be inserted into the chamber from said direction; and
      (B-2) a stopper member provided within said chamber at a position beyond said opening in said direction;
   (C) loading means for pulling out a portion of the medium from the cassette placed at said predetermined position and loading the pulled out portion of the medium on said recording and/or reproducing means, said loading means having at least one pull-out member which is movable between a first position where the pull-out member is positioned behind a portion of the medium strained between the supporting members within the cassette when the cassette is placed at said predetermined position by said receiving means and a second position where the pull-out member pulled out a portion of the medium from the cassette; and
   (D) urging means for urging the cassette accommodated at said chamber of said receiving means against said stopper member along said direction before the cassette is placed at said predetermined position by the receiving means.

2. The apparatus according to claim 1, wherein said urging means includes at least one spring member for exerting an urging force on the cassette received in said receiving means.

3. The apparatus according to claim 2, wherein said spring member is provided on a portion of said receiving means.

4. The apparatus according to claim 3, wherein said urging means is provided at a portion of said receiving means.

5. The apparatus according to claim 3, wherein said chamber of said receiving means further has a bottom surface for receiving thereon the inserted cassette; and said receiving means further has at least one elastic member for urging the cassette inserted into said chamber against said bottom surface of the chamber.

6. A magnetic recording and/or reproducing apparatus arranged to use a magnetic tape supported by a pair of reels within a cassette, said apparatus comprising:
   (A) magnetic recording and/or reproducing means for magnetically recording signals on and/or magnetically reproducing recorded signals from the tape;

(B) a cassette holder for holding the cassette, said holder being movable between a first position where the holder receives the cassette from a predetermined direction and a second position where the holder places the received cassette at a predetermined position relative to said recording and/or reproducing means for the signal recording and/or reproduction and having:
- (B-1) a chamber for accommodating the cassette, said chamber having a bottom surface for receiving thereon the cassette and an opening for enabling the insertion of the cassette into the chamber from said direction; and
- (B-2) a stopper fixedly provided on a portion of the holder within said chamber at a position beyond said opening in said direction;

(C) tape loading means for pulling out a portion of the tape from the cassette placed at said predetermined position by said holder and loading the pulled out portion of the tape on said recording and/or reproducing means, said loading means having at least one movable member which is movable between a first position where the movable member is positioned behind a portion of the tape strained between the reels within the cassette when the cassette is placed at the predetermined position and a second position where the movable member pulled out a portion of the tape from the cassette; and (D) urging means for urging the cassette inserted into said holder, said urging means including:
- (D-1) at least one first urging member for urging the cassette against the bottom surface of said chamber of the holder; and
- (D-2) at least one second urging member for urging the cassette against said stopper along said direction.

7. The apparatus according to claim 6, wherein said first and second urging members are provided on portions of said holder.

* * * * *